US011013077B2

(12) United States Patent
Saes et al.

(10) Patent No.: US 11,013,077 B2
(45) Date of Patent: May 18, 2021

(54) LED DRIVER DIMMING

(71) Applicant: Eldolab Holding B.V., Eindhoven (NL)

(72) Inventors: Marc Saes, Eindhoven (NL); Stephen Haight Lydecker, Snellville, GA (US)

(73) Assignee: ELDOLAB HOLDING B.V., Eindhoven (NL)

( * ) Notice: Subject to any disclaimer, the term of this patent is extended or adjusted under 35 U.S.C. 154(b) by 275 days.

(21) Appl. No.: 16/091,187

(22) PCT Filed: Apr. 21, 2017

(86) PCT No.: PCT/NL2017/050260
§ 371 (c)(1),
(2) Date: Oct. 4, 2018

(87) PCT Pub. No.: WO2017/183984
PCT Pub. Date: Oct. 26, 2017

(65) Prior Publication Data
US 2020/0329537 A1     Oct. 15, 2020

(30) Foreign Application Priority Data

Apr. 22, 2016  (NL) .................................. 2016665

(51) Int. Cl.
*H05B 45/10* (2020.01)
*H05B 45/20* (2020.01)
*H05B 45/48* (2020.01)

(52) U.S. Cl.
CPC ............ *H05B 45/10* (2020.01); *H05B 45/20* (2020.01); *H05B 45/48* (2020.01)

(58) Field of Classification Search
None
See application file for complete search history.

(56) References Cited

U.S. PATENT DOCUMENTS 10,299,321 B1 *   5/2019  Trask ..................... H05B 45/20
2012/0038291 A1 * 2/2012  Hasnain ................ H05B 45/20
                                                        315/294

(Continued)

FOREIGN PATENT DOCUMENTS

DE        102008029816 A1    12/2009

OTHER PUBLICATIONS

PCT Publication No. WO 2017/103984 A1 for International Application No. PCT/NL2017/050260, published Oct. 26, 2017, with International Search Report, 23 pages.

(Continued)

*Primary Examiner* — Alexander H Taningco
*Assistant Examiner* — Pedro C Fernanadez
(74) *Attorney, Agent, or Firm* — RatnerPrestia

(57) ABSTRACT

An LED driver has outputs to drive LEDs in groups of different colour temperatures. An input is configured to receive setpoint information, and a control device is configured to determine a combined LED setpoint intensity for the groups and a combined LED setpoint colour temperature for the groups, from the LED setpoint information. If the LED setpoint intensity is above a threshold, the control device operates the LED driver outputs to mix the LED group outputs to jointly achieve the LED setpoint intensity and the LED setpoint colour temperature. If the LED setpoint intensity is below the threshold, the control device selects a single LED group, operates the LED driver output associated with the selected LED group to drive that one LED group at the LED setpoint intensity, and operates the remaining LED driver outputs to drive the remaining LED groups at zero LED intensity.

12 Claims, 4 Drawing Sheets

(56) References Cited

U.S. PATENT DOCUMENTS

| | | | | |
|---|---|---|---|---|
| 2012/0104974 A1* | 5/2012 | Saes | ..................... | H05B 45/375 |
| | | | | 315/297 |
| 2014/0210355 A1* | 7/2014 | Cash | ..................... | H05B 45/48 |
| | | | | 315/151 |
| 2014/0232270 A1* | 8/2014 | Kimura | .................. | H05B 45/20 |
| | | | | 315/122 |
| 2015/0091472 A1 | 4/2015 | Kadotani et al. | | |

OTHER PUBLICATIONS

Written Opinion in International Application No. PCT/NL2017/050260, dated Aug. 25, 2017, 7 pages.

\* cited by examiner

LED DRIVER DIMMING

This application is a U.S. National Phase Patent Application of International Application No. PCT/NL2017/050260, filed Apr. 21, 2017, which claims priority to Netherlands Application No. NL 2016665, filed Apr. 22, 2016, the disclosures of which also are entirely incorporated herein by reference.

The invention relates to an LED driver configured to drive a plurality of LEDs and to an LED illumination assembly comprising such LED driver.

In LED illumination, commonly plural groups of LEDs are used. Each of the groups comprises LEDs that are configured to illuminate at a particular colour temperature. For example, the LEDs comprise a group of LEDs that illuminate white light, a group of LEDs that illuminate warm white light, a group of LEDs that illuminate cold white light, and a group of LEDs that illuminate yellowish white light. Each group may comprise one or more LEDs. When operating the LEDs, a mixing of the different groups will determine an overall colour tone that is emitted. For example, combining white with warm white will result in a slightly warm colour tone. The more warm white is added, the warmer the colour tone. Furthermore, an overall intensity of the emitted light is set by dimming, for example by means of a reduction of a supply current passing through the LEDs or by means of reducing a duty cycling of the LEDs (e.g. by means of serial or parallel switches) or by means of a combination of reduction of the supply current and duty cycling. It is noted that a balance between the effective currents through and therefore intensities of the different groups determines the colour tone.

The invention aims to provide an enhanced way of dimming.

Accordingly, according to an embodiment of the invention, there is provided an LED driver configured to drive a plurality of LEDs, the LEDs being arranged in groups having respective different colour temperatures, the LED driver comprising respective LED driver outputs, each LED driver output being connected to a respective one of the LED groups for driving that LED group,
wherein the LED driver comprises a setpoint input configured to receive setpoint information, and a control device, the control device being configured to operate the LED driver outputs so as to drive the LED groups in accordance with the setpoint information,
wherein the control device is configured to:
  determine an LED setpoint intensity and an LED setpoint colour temperature from the LED setpoint information, the LED setpoint intensity representing a desired combined intensity of the LED groups, the LED setpoint colour temperature representing a desired combined colour of the LED groups;
  compare the LED setpoint intensity to a predetermined threshold;
  in case the LED setpoint intensity is above the predetermined threshold: operate the LED driver outputs to mix the LED groups to jointly operate at the LED setpoint intensity and the LED setpoint colour temperature
  in case the LED setpoint intensity is below the predetermined threshold: deviate from the LED setpoint colour temperature by selecting a colour temperature of a single one of the LED groups, the colour temperature of the single one of the LED groups being different from the LED setpoint colour temperature, select the single one of the LED groups having the selected colour temperature; operate the LED driver output associated with the selected single one of the LED groups to drive the selected single one of the LED groups at the LED setpoint intensity; and operate the remaining LED driver outputs to drive the remaining LED groups at zero LED intensity.

Each LED group may comprise at least one LED. The LED groups may each have a different colour temperature, i.e. the groups may each radiate at a different colour. The term colour temperature may be understood as a calibrated colour temperature, as may be displayed in a chromaticity diagram. The term colour temperature may also be understood as a colour.

The driver comprises a setpoint input, such as a network connection that connects to a data bus or may other setpoint input, that provides for setpoint information. The setpoint information may comprise data that provides a desired intensity. The setpoint information may also comprise a desired colour (or alternatively, no colour may be comprised in the setpoint information; colour may be derived as a function of the intensity. The function may be predetermined in the driver or may be part of configuration info to the driver or may be part of the setpoint information. For example, the setpoint information may be provided by a light bus that provides data to plural drivers each connected to the bus.

The driver may be formed by a single module, e.g. a single printed circuit board. The driver may comprise a control device provided with program instructions to perform the stated functions. The control device receives the setpoint information and determines therefrom an LED setpoint intensity i.e. an overall intensity as is to be emitted by the combined LED groups. The control device also derives a desired colour temperature from the setpoint information. The desired colour temperature may either be included in the setpoint information (i.e. colour information may be transmitted to the driver) or the control device may derive the desired colour temperature from the setpoint intensity. For example, the control device may adjust the colour temperature depending on the intensity: e.g. the lower the intensity, the more the colour temperature is set towards the warm, and the higher the intensity, the more the colour temperature is set towards the cold. Thereby, a behaviour of a conventional light source, such as a filament bulb light source, may be emulated, as in such as light source, dimming will result in a lower filament temperature, hence providing a lower colour temperature of the emitted light. Changing a colour temperature towards the warm when dimming may also be considered "natural" by a human observer, and adding a warm atmosphere to the dimmed light.

In order for the control device to drive the groups of LEDs, the control device may control LED driver outputs, each LED driver output connected to a respective one of the LED groups. The LED driver outputs may for example be driven by the control device so as to activate the group, de-activate the group, or repetitively activate and de-activate the group to provide a time modulation (e.g. pulse width modulation, frequency modulation, etc.). The LED driver may for example comprise a current source, such as a switched mode current source, and switches (such as parallel or serial switches configured to let the LED supply current as provided by the current source flow through the respective groups or not).

The control device compares the LED setpoint intensity to a threshold. When above the threshold, the control device operates the LED groups (e.g. by driving the current source and the switches) so as to jointly provide the LED setpoint intensity and the LED setpoint colour temperature. Thus, in order to provide a desired LED colour temperature, normally a mixture of the LED groups (having different colours) will be desired so as to provide a colour mix that corresponds to the desired colour. When (at the threshold or) below the threshold, the control device deviates from this behaviour, in that the control device tends towards a single LED group colour. Thus, instead of operating at the desired LED colour temperature, as provided by the LED setpoint colour temperature, the control device selects a colour temperature of a single one of the LED groups, which selected colour temperature (in most or all cases) differs from the LED setpoint colour temperature. The control device selects the single one of the groups having the selected colour temperature, and operates the single one of the groups. It will be understood that in the exceptional case when the LED setpoint colour temperature equals the colour temperature of the selected LED group, the colour temperature as emitted at low intensities will equal the setpoint colour temperature, and in practically all other cases, the colour temperature as emitted at low intensities will differ from the setpoint colour temperature. The LED intensity as set by the setpoint information is thus fully provided by the single one of the LED groups. The remaining LED groups are set at a zero intensity, i.e. are not operated. In particular at low intensities, the dimming of the LED groups will normally be accompanied by a pulsed operation of the LED groups, applying a modulation technique such as for example pulse width modulation or frequency modulation. At low intensities, the pulse widths will hence be small. The LED drive current that is provided to the LEDs, e.g. by the current source of the driver, may exhibit a ripple. The ripple may be due to a variety of causes, e.g. the current source being a switched mode current source resulting in a switching ripple, or other causes (such as disturbances from the microcontroller acting as the control device, disturbances from a rectified mains frequency, disturbances from digital data communication switching at the data bus that connects to the driver, disturbances from a switching of a DC/DC converter that converts an input supply voltage , e.g. the rectified mains voltage, into a DC supply voltage, etc. As such a ripple may be asynchronous to a switching on and off of the dimmed LED group, disturbing effects, such as aliasing, may result in flicker or other undesired effects, in particular of the LED group that operates at low intensity. In particular at low intensity, an effect of the ripple may be large, due to the associated small pulse widths. As the LED driver reverts to a single group a low intensities, pulse widths at which the single group is operated may be kept relatively large, while mixing of other groups (possibly at smaller pulse widths) may be avoided, which may provide that adverse effects as described above may to a large extent be avoided.

Accordingly, complex synchronisation between the controller resp. the current source of the one hand and the switching on the other hand, may be avoided.

Furthermore, in case of two different physical devices, such synchronisation is much harder to accomplish between such two different physical devices, e.g. having separate control units, than in a single driver having a single control unit. It may provide timing requirements in the microsecond scale (align edges of ripple, pulses, modulation periods, modulation cycle). When distributing the driver functions over multiple physical devices, e.g. one unit comprising the controller and current source, the other unit comprising the switches, mutually asynchronous or out of phase switching may occur, which may aggravate the synchronisation issues. For example, in case the switching of the switches is operated by a separate switching controller of the switching unit, such as a separate microcontroller that controls the switches. Then, the setting of the current of the current source by the controller and the switching of the switches that provide for the dimming by means of duty cycling may be asynchronous, which may aggravate the problem. According to the invention, selecting and operating a single colour at the low intensities may address such effects, so that a synchronisation between the controllers of the units may be omitted. As a result, dimming down to approximately 0.1%, without unstable colour shift as a result of the above described phenomena, may be provided.

Thus, synchronisation between LED driver current source and light engine modulation may be omitted and a higher performance in terms of resolution, contrast and stability may be achieved, while retaining more flexibility to activate the selected LED group at time instants as desired, which may further improve system performance at low intensity, e.g. allowing accurate and smooth light intensity dimming.

As a light sensitivity of a human observer tends to be logarithmical, low intensities tend to be well observable to the human eye. Even a slight amount of light is perceived as rather bright by the human eye. Due to the logarithmic sensitivity, small dimming steps may be required to dim fluently, thus to prevent that the human eye easily perceives the steps at low intensity. As, according to the invention, only a single LED group is active at low intensities, a maximum dimming resolution may be provided, hence a better performance may be achieved in terms of smooth dimming at low intensities.

Furthermore, spottiness may be prevented: when dimming with a luminaire, even when using a frosted lens or similar means to mix radiation from different LED's, it may become visible to an observer that spots of different colour temperature are mixed. As according to the invention, at low intensities the control device deviates from the setpoint colour temperature towards a colour temperature of a single LED group, thus operating a single LED group only, such low intensity spottiness may be avoided. In an embodiment, the control device is configured to select the single one of the LED groups based on the LED setpoint colour temperature. Hence, the control device may select a single group having a colour temperature that best matches the LED setpoint colour temperature.

In an embodiment, the control device is further configured to:

select the single one of the LED groups as having a warmer colour temperature than the LED setpoint colour temperature of the LED set point information. For example, the LED group having the nearest warmer colour temperature is selected, thereby being in line with the expected behaviour of a conventional light source, such as a filament light bulb, of which the colour temperature changes to the warmer when dimming.

In an embodiment, the control device is further configured to: select the single one of the LED groups as nearest to the LED setpoint colour temperature in a chromaticity diagram. Accordingly, the control device may select one of the groups that is most closest in colour temperature to the desired colour temperature, so as to get a lowest colour deviation from the desired colour temperature when operating the single LED group only.

In an embodiment, the control device is further configured to:

select the single one of the LED groups as a nearest warmer colour temperature than the LED setpoint colour temperature. Thereby, on the one hand, the control device may select one of the groups that is most closest in colour temperature to the desired colour temperature, and on the other hand, a behaviour may be kept in line with the expected behaviour of a conventional light source of which the colour temperature changes to the warmer when dimming.

In an embodiment, the control device is further configured to set the predetermined threshold at substantially 1%, 5% or 10% of a nominal intensity of the LED groups. The threshold may be fixed, e.g. preset, e.g. at a percentage of nominal (e.g. full) intensity of the LEDs, or may be set during manufacturing, installation, commissioning or during operation (e.g. during a maintenance cycle) of the LED driver.

In an embodiment, instead of a fixed threshold, the predetermined threshold may be formed by a threshold range between a lower threshold and an upper threshold, the LED driver further being configured to provide a transition region from the LED setpoint colour temperature to the single LED group colour temperature, the transition region extending between the upper threshold and the lower threshold. The transition region may provide for a desired transition between the setpoint colour temperature and the single LED group colour temperature, for example using a mathematical relation (e.g. a linear, quadratic, polynomial, spline function) or a table, such as a look up table. Furthermore, extra information, such as data from a sensor (e.g. ambient light, daylight, etc.), may be used to provide extra input.

In an embodiment, the LED driver comprises a current source configured to generate an LED drive current, and a switching module electrically connected to the current source and configured to switch, in accordance with the LED driver outputs, the LED drive current generated by the current source into a selection of the LED groups. The LED driver outputs are operated by the control device. The switching module may form an integral part with the current source, e.g. provided on a same printed circuit board. Alternatively, switching module and the remainder of the driver (comprising current source and control device) form a separate units, e.g. separate printed circuit boards. In an embodiment, the switching module and the LEDs are provided together on a same printed circuit board, so as to provide short connections between the LEDs and the switches that activate/deactivate the LEDs. Using the switching module, the outputs of the switches of the switching module may form the LED driver outputs.

In an embodiment, the current source is a switched mode current source, wherein the control device is configured to control the current source so as to control a magnitude of the LED drive current, the control device being configured to drive the LEDs based on the setpoint information by controlling the magnitude of the LED drive current and controlling the switching module so as to drive the switches. The current source may be controlled by the control device, e.g. by setting a setpoint of the current source, so that the LED current as provided by the current source is dimmed according to the setpoint value. The current source may for example be dimmed from 100% to e.g. 10% or 15% of a nominal current. The modulation of the current of the current source may set an intensity in the LED group that operates at the highest intensity of the LED groups. The other groups may further be dimmed to a lower level of intensity by means of the switching on/off using the switches and using any suitable modulation technique. For further dimming to lower levels, the switching on/off using the switches and using any suitable modulation technique may be applied in combination with the reduction of the LED current as provided by the current source.

In an embodiment, there is provided an LED illumination assembly comprising:
a plurality of LEDs, the LEDs being arranged in groups having respective different colour temperatures, and
an LED driver according to the invention, the LED driver being connected to the plurality of LEDs for driving the plurality of LEDs.

With the LED illumination assembly according to the invention, the same or similar effects may be achieved as with the LED driver according to the invention.

In an embodiment, the LED assembly further comprises a current source configured to generate an LED drive current and at least one switch to modulate at least one of the LED groups, wherein the illumination assembly is configured to enable (i.e. to allow) a modulation of the at least one LED group by the at least one switch to operate asynchronously in respect of a generation of the LED drive current by the current source (e.g. a switched mode current source). Hence, as explained above with reference to the LED driver according to the invention, as the driver deviates from the setpoint colour temperature towards operating a single LED group at low intensity, the modulation of the LED group(s) becomes less sensitive to a ripple or other periodicity in the LED drive current, which may provide a high performance at low intensity even when the modulation runs asynchronously from the generation of the LED drive current (e.g. by a switched mode current source).

Further advantages, features and effects may follow from the appended drawing and below description, in which non-limiting embodiments of the invention will be illustrated, wherein.

Figure 1:
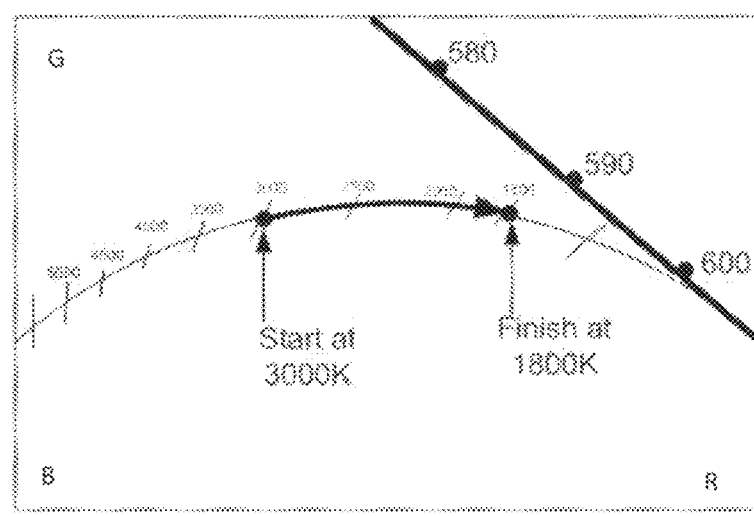
FIG. 1 depicts a chromaticity diagram based on which a colour change during dimming will be explained.
Figure 2:
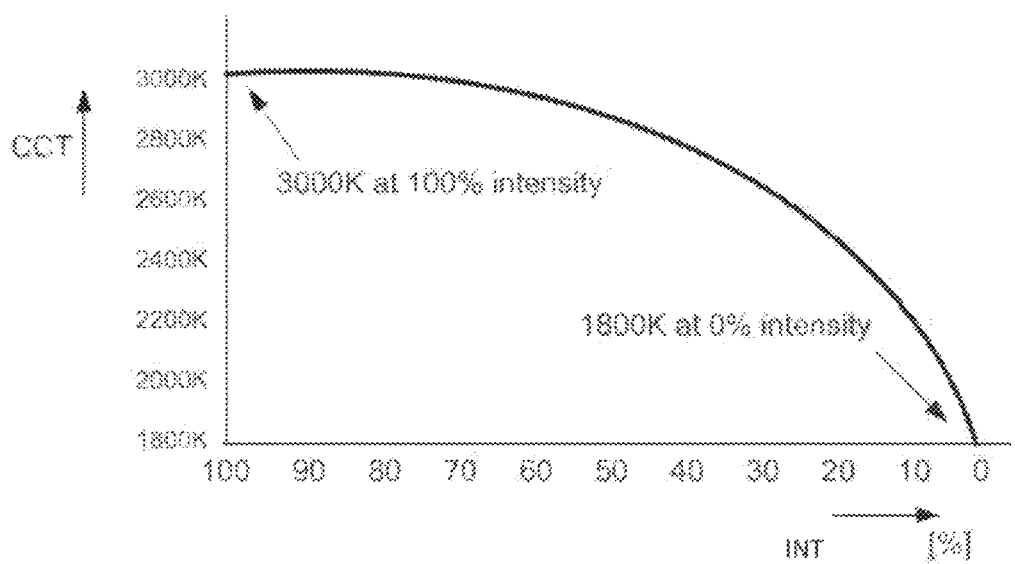
FIG. 2 depicts a diagram of colour temperature versus intensity, according to the colour change in accordance with FIG. 1.

FIGS. 1 and 2 illustrate a colour temperature change as a function of an intensity level of the LEDs. In particular, an example that illustrates warm dimming is provided. Using warm dimming, the light gets warmer at lower intensities (so as to emulate a behaviour of for example an incandescent lamp).

FIG. 1 depicts a chromaticity diagram, whereby Greenish G is depicted in a top left corner, Blueish B is depicted in a bottom left corner, Reddish R is depicted in a bottom right colour. A curve of colour temperatures ranging from above 500 to below 1800 is depicted as a curve in the chromaticity diagram. FIG. 1 depicts a desired dimming to warm curve in the chromaticity diagram while FIG. 2 depicts a related curve of chromaticity CCT versus intensity INT. As can be seen from FIGS. 1 and 2, the colour temperature changes from 3000K at 100% intensity to 1800K at or near 0% intensity.

Figure 3:
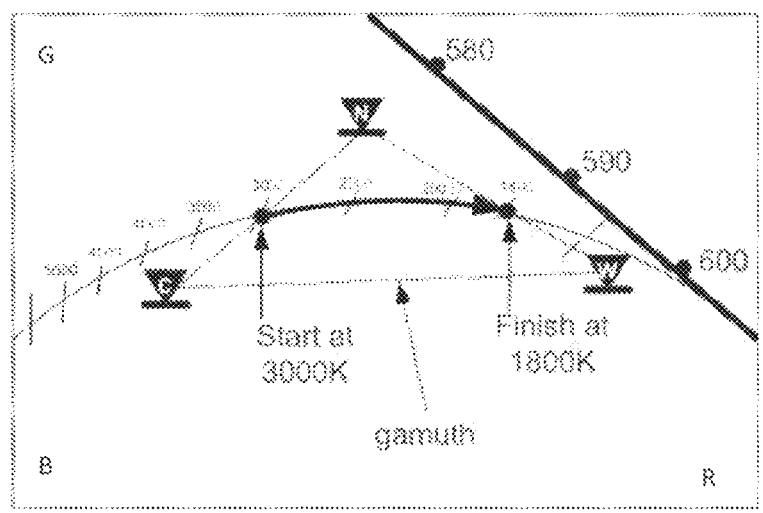
FIG. 3 depicts a chromaticity diagram based on which a colour mixing will explained.

In FIG. 3, the colour diagram depicts 3 LED groups, namely neutral while N, cold white C and warm white W, each having a different colour temperature. Combinations (mixing) of the LED groups will result in colours in between the colours of the groups, as illustrated by the dotted triangle. As the colour points from 3000K to 1800K are in the triangle, these colours can be mixed by driving the LED groups accordingly. Accordingly, FIG. 3 illustrates the dia method of generating such a curve using a Cold white LED (C or CW), a Neutral white LED (N or NVV) and a Warm white LED (W or WW).

The triangle is the gamuth of colours that can be made by suitable mixing of the 3 LEDs. So also the curve given can be made. The driver would deliver 1 current in 1 channel with a suitable algorithm (that is e.g. an analog current from 100% to about 10% and a pulse modulated current between 5% and 0.1% and perhaps something of both in between. Below approximately 5% the analog current becomes unstable) and the driver switches dividing the current over the 3 LED groups.

Figure 4:
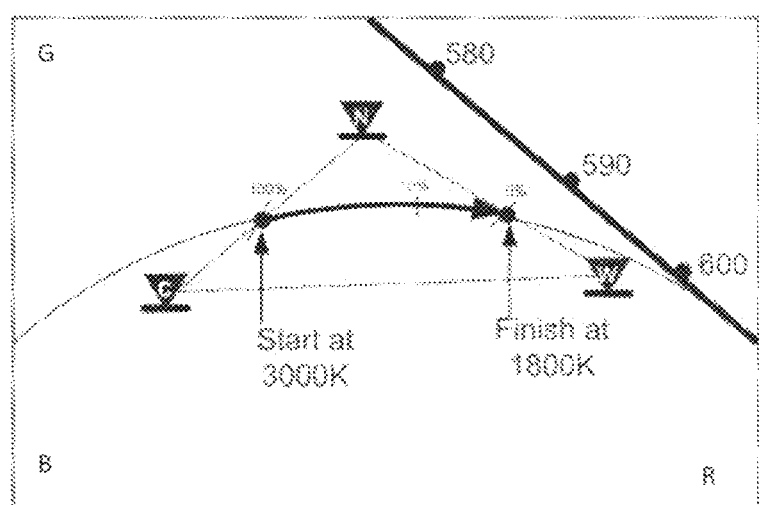
FIG. 4 depicts a chromaticity diagram in accordance with FIG. 3, including intensities.

FIG. 4 provides the same figure however with the intensity percentages annotated to the CCT curve (CCT=Calibrated Colour Temperature; in daily life: colour).

Figure 5:
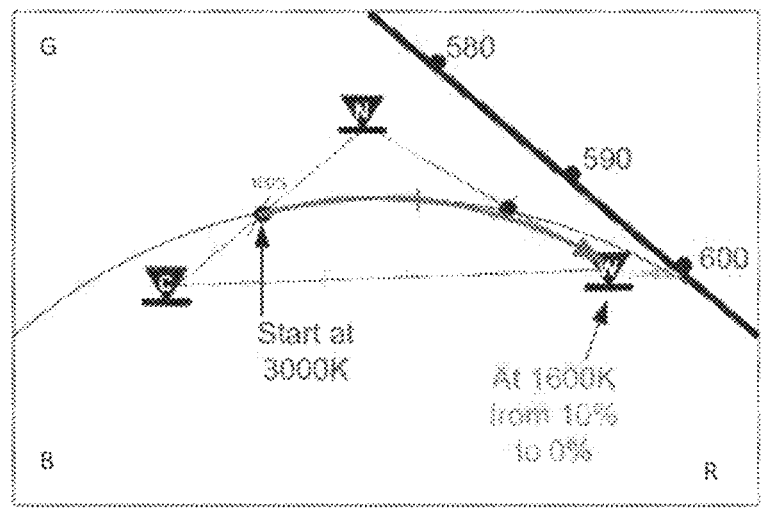
FIG. 5 depicts a chromaticity diagram based on which an embodiment of the invention will be explained.
Figure 6:
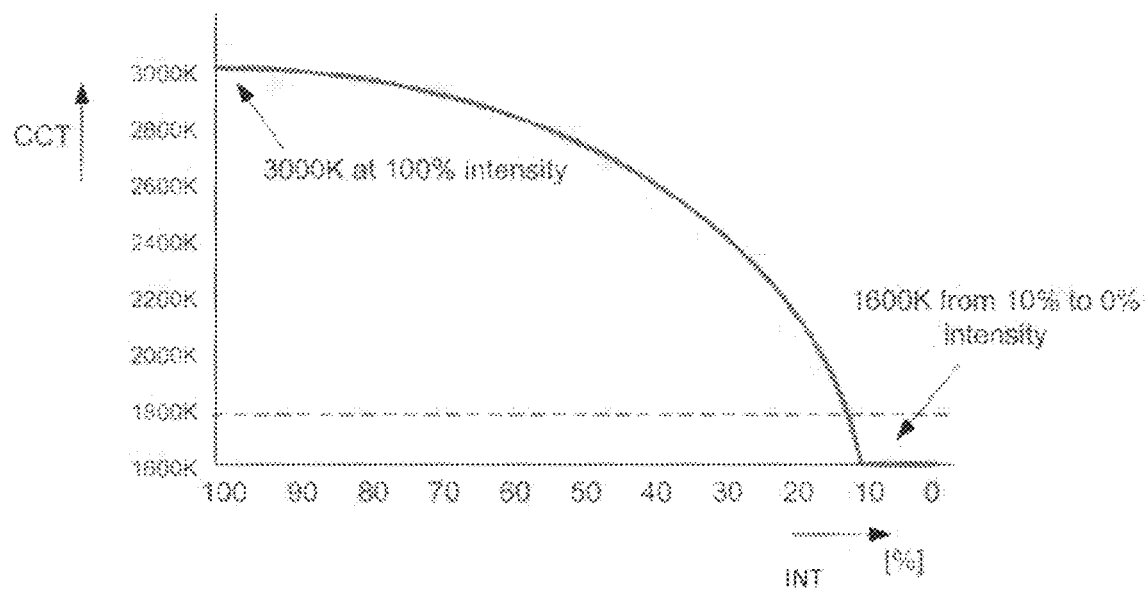
FIG. 6 depicts a diagram of colour temperature versus intensity, according to the colour change in accordance with FIG. 5.

According to an embodiment of the invention, to avoid e.g. current synchronisation issues between the driver and the switches in the more sensitive (dimmed) area, the idea is to dim to a single LED group, e.g. in the present example the warm LED primary colour, so that only 1 LED (group) needs to be ON. The switches that activate the LED groups then need not to switch below 10%. FIG. 5 depicts an example, whereby in the chromaticity diagram, the colour temperature reverts to 1600K of the warm white W at intensity below the threshold of 10%, as the single LED group of warm while W is chosen below 10% intensity. A corresponding diagram of colour temperature CCT versus intensity INT is depicted in FIG. 6, again depicting that below 10% intensity, the colour temperature reverts to 1600K. It is noted that, instead of going to the warm white "primary" colour, one could also go to the neutral colour or even the cold colour as desired.

Since in a tunable White the colour temperature CCT can be anywhere in the gamuth reachable using the given LEDs (as it is separately controlled), the best single colour to dim to is dependent on the chosen CCT by the user. Correspondingly, in one case it might be better to dim2ColdWhite, while in another dim2NeutralWhite or dim2WarmWhite would be a better choice at lower intensities. Different strategies may be used among which:
  Dim to nearest. Near being measured in f.e. the c,y co-ordinates of the chromaticity diagram or in whatever other colour describing system. or
  Dim to nearest warmer. Typically humans are used to light getting 'warmer' when the intensity is lower and would be surprised if the light would get 'colder'. So even if a colder LED would be nearer the strategy could be to not dim to that near cold LED but to the nearest and warmer LED.

As the chromaticity diagram also allows colours not expressed in cold-warm terms (like pure Red, pure Green and pure Blue), other strategies can be thought of like: 'dim to Blue' dim to Red', etc. In general a strategy may be defined as 'dim to (c,y=a tuple of 2 numbers)' or dim2CCT Instead of a threshold as a single level, a transition range may be applied from the set colour temperature to the colour temperature of the single LED group.

For example, in the transition range, some trajectory between the points (set colour temperature according to the setpoint information, at 10% intensity) and (single LED group colour temperature, at 5% intensity) could be defined. The transition could be provided by on the one hand dimming the value of the LED current as provided by the current source, and on the other hand the switching of the switches to activate the LED groups during part of the time. Hence, dimming of the current source and dimming by time modulation of the switches that activate the LED groups may co-operate to follow such trajectory, where when dimming below 5% the MGB would only distribute the current to 1 single LED group and the driver would dim further down to 0.1%.

Such a trajectory could be defined in mathematical form (f.e. as a line, quadratic function, polynominal, spline), as a table, and be influenced by extra inputs such as sensor inputs (f.e. measuring daylight intensity).

Definition of colors, gamuths, trajectories etc, could be done in any colorspace (RGB, CXY, Saturation Hue . . . ) and the driver, MGB and or the combination could have the appropriate conversion functions or direct handling functions.

In case of a separate switching module, the switching module and the remainder of the driver may work together as master-slave or slave-master or on a peer1-peer2 role-based scenario or they could be sub-ordinates to some external master.

Figure 7:
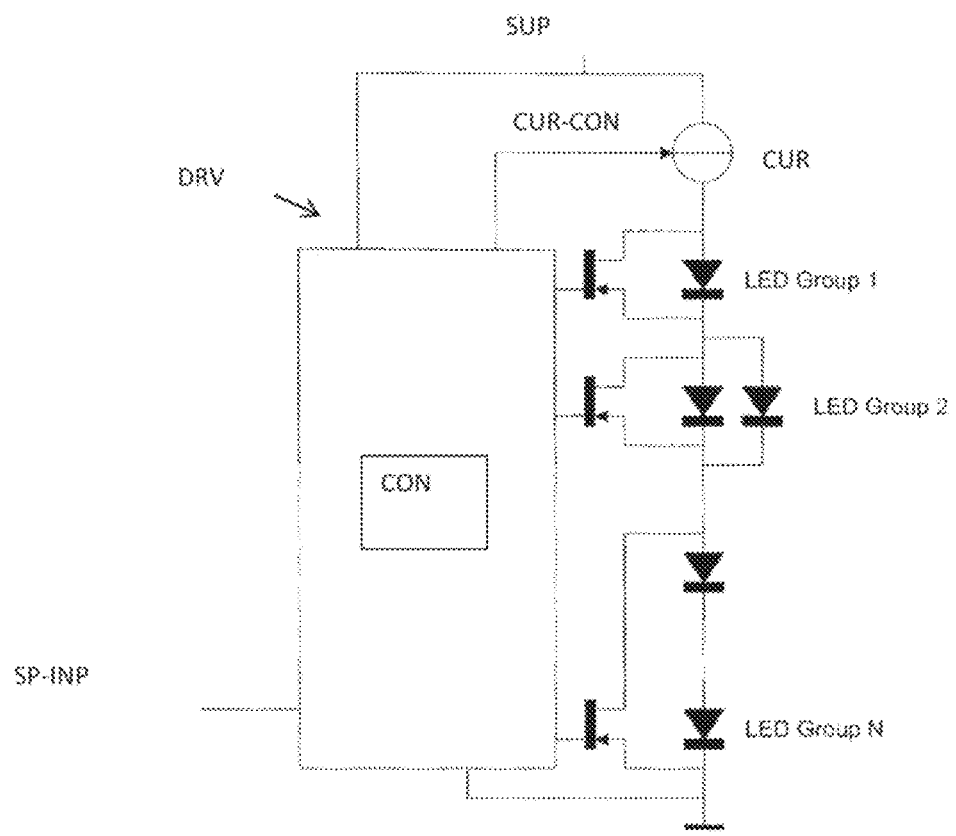
FIG. 7 depicts a highly schematic diagram of a driver in which the invention may be embodied, and groups of LEDs.

FIG. 7 depicts a schematic view of an LED driver DRV comprising a setpoint input SP-INP, such as a network connection, at which setpoint information, such as setpoint digital data, is received. The driver further comprises a current source CUR, such as a switched mode current source, e.g. a free running, hysteretic, switched mode current source, that provides a current to groups of LEDs, in the present example the groups of LEDs (group 1, group 2, . . . group N) being connected in series. The driver is powered from a supply voltage SUP, such as a rectified mains, a rectified, DC/DC converted mains, a battery supply, etc.

The driver further comprises switches, in the present example parallel switches in parallel to each one of the groups. The respective connections of the switches to the LED groups forming LED driver outputs. Thus, a first LED driver output is formed by the source and drain of the parallel transistor of the first LED group, a second LED driver output is formed by the source and drain of the parallel transistor of the second LED group, and a N-th LED driver output is formed by the source and drain of the parallel transistor of the N-th LED group. It will be understood that, instead of parallel switches, other topologies applying for example serial switches may be applied and fall within the scope of the present invention as well. The LED driver further comprises a control device, such as a programmable microprocessor, microcontroller, etc. provided with suitable program instructions to perform the described functions. The LED groups may for example provide (in case of 3 groups) white, cold white, and warm white.

The control device determines, from the setpoint at the setpoint input, an overall LED intensity and an overall LED colour. When above a threshold, the control device controls the current source to provide a current that is sufficiently large to achieve the required intensity. The control device further operates the switches parallel to the LED groups, so as to dim the LED groups as desired to achieve the setpoint intensity and colour tone. When below the threshold, as described above, instead of operating plural LED groups to achieve the desired colour temperature, the driver selects a single LED group having a colour that is warmer, nearest, or nearest warmer (or otherwise), and operates this LED group at the selected intensity, while the other LED groups are operated at zero intensity (by correspondingly driving their parallel switches). As a result, an effect of a current ripple due to e.g. switching of the current source, or due to any other disturbance, which may have an effect a resulting optical output at low intensities, may be reduced, as groups that would—at the low intensity levels—have been set at very low pulse widths, may be switched off. Correspondingly, switching effects due to the asynchronous character of a ripple on the LED current on the one hand, and pulsed operation of the LED groups on the other hand, may be reduced.

The invention may further be defined by the following numbered clauses which form part of the description:

1. An LED driver configured to drive a plurality of LEDs, the LEDs being arranged in groups having respective different colour temperatures, the LED driver comprising respective LED driver outputs, each LED driver output being connected to a respective one of the LED groups for driving that LED group,
    wherein the LED driver comprises a setpoint input configured to receive setpoint information, and a control device, the control device being configured to operate the LED driver outputs so as to drive the LED groups in accordance with the setpoint information,
    wherein the control device is configured to:
        determine an LED setpoint intensity and an LED setpoint colour temperature from the LED setpoint information, the LED setpoint intensity representing a desired combined intensity of the LED groups, the LED setpoint colour temperature representing a desired combined colour of the LED groups;
        compare the LED setpoint intensity to a predetermined threshold;
        in case the LED setpoint intensity is above the predetermined threshold:
            operate the LED driver outputs to mix the LED groups to jointly operate at the LED setpoint intensity and the LED setpoint colour temperature;
        in case the LED setpoint intensity is below the predetermined threshold:
            select a single one of the LED groups;
            operate the LED driver output associated with the selected single one of the LED groups to drive the selected single one of the LED groups at the LED setpoint intensity; and
            operate the remaining LED driver outputs to drive the remaining LED groups at zero LED intensity.

2. The LED driver according to clause 1, wherein the control device is configured to select the single one of the LED groups based on the LED setpoint colour temperature.

3. The LED driver according to clause 1 or 2, wherein the control device is further configured to:
    select the single one of the LED groups as having a warmer colour temperature than the LED setpoint colour temperature of the LED set point information.

4. The LED driver according to any of the preceding clauses, wherein the control device is further configured to:
    select the single one of the LED groups as nearest to the LED setpoint colour temperature in a chromaticity diagram.

5. The LED driver according to any of clause 1-3, wherein the control device is further configured to:
    select the single one of the LED groups as a nearest warmer colour temperature than the LED setpoint colour temperature.

6. The LED driver according to any of the preceding clauses, wherein the control device is further configured to set the predetermined threshold at substantially 1%, 5% or 10% of a nominal intensity of the LED groups.

7. The LED driver according to any of the preceding clauses, wherein the predetermined threshold is formed by a threshold range between a lower threshold and an upper threshold, the LED driver further being configured to provide a transition region from the LED setpoint colour temperature to the single LED group colour temperature, the transition region extending between the upper threshold and the lower threshold.

8. The LED driver according to any of the preceding clauses, comprising a current source configured to generate an LED drive current, and a switching module electrically connected to the current source and configured to switch, in accordance with the LED driver outputs, the LED drive current generated by the current source into a selection of the LED groups.

9. The LED driver according to clause 8, wherein the current source is a switched mode current source, wherein the control device is configured to control the current source so as to control a magnitude of the LED drive current, the control device being configured to drive the LEDs based on the setpoint information by controlling the magnitude of the LED drive current and controlling the switching module so as to drive the switches.

10. The LED driver according to any of the preceding clauses, wherein
    the control device being configured to
        select a single one of the LED groups, comprises:
    the control device being configured to
        deviate from the LED setpoint colour temperature by selecting a colour temperature of a single one of the LED groups, the colour temperature of the single one of the LED groups being different from the LED setpoint colour temperature, and
        select the single one of the LED groups having the selected colour temperature.

The invention claimed is:

1. An LED driver configured to drive a plurality of LEDs, the LEDs being arranged in groups having respective different colour temperatures, the LED driver comprising respective LED driver outputs, each LED driver output being connected to a respective one of the LED groups for driving that LED group,
    wherein the LED driver comprises a setpoint input configured to receive setpoint information, and a control device, the control device being configured to operate the LED driver outputs so as to drive the LED groups in accordance with the setpoint information,
    wherein the control device is configured to:
        determine an LED setpoint intensity and an LED setpoint colour temperature from the LED setpoint information, the LED setpoint intensity representing a desired combined intensity of the LED groups, the LED setpoint colour temperature representing a desired combined colour of the LED groups; and
        compare the LED setpoint intensity to a predetermined threshold;
        in case the LED setpoint intensity is above the predetermined threshold:
            operate the LED driver outputs to mix the LED groups to jointly operate at the LED setpoint intensity and the LED setpoint colour temperature;
        in case the LED setpoint intensity is below the predetermined threshold:

deviate from the LED setpoint colour temperature representing the desired combined colour of the LED groups by selecting a colour temperature of a single one of the LED groups, the colour temperature of the single one of the LED groups being different from the LED setpoint colour temperature, select the single one of the LED groups having the selected colour temperature;

operate the LED driver output associated with the selected single one of the LED groups to drive the selected single one of the LED groups at the LED setpoint intensity; and operate the remaining LED driver outputs to drive the remaining LED groups at zero LED intensity.

2. The LED driver according to claim 1, wherein the control device is configured to select the single one of the LED groups based on the LED setpoint colour temperature.

3. The LED driver according to claim 1, wherein the control device is further configured to:

select the single one of the LED groups as having a warmer colour temperature than the LED setpoint colour temperature of the LED set point information.

4. The LED driver according to claim 1, wherein the control device is further configured to:

select the single one of the LED groups as nearest to the LED setpoint colour temperature in a chromaticity diagram.

5. The LED driver according to claim 1, wherein the control device is further configured to:

select the single one of the LED groups as a nearest warmer colour temperature than the LED setpoint colour temperature.

6. The LED driver according to claim 1, wherein the control device is further configured to set the predetermined threshold at substantially 1%, 5% or 10% of a nominal intensity of the LED groups.

7. The LED driver according to claim 1, wherein the predetermined threshold is formed by a threshold range between a lower threshold and an upper threshold, the LED driver further being configured to provide a transition region from the LED setpoint colour temperature to the single LED group colour temperature, the transition region extending between the upper threshold and the lower threshold.

8. The LED driver according to claim 1, comprising a current source configured to generate an LED drive current, and a switching module electrically connected to the current source and configured to switch, in accordance with the LED driver outputs, the LED drive current generated by the current source into a selection of the LED groups.

9. The LED driver according to claim 8, wherein the current source is a switched mode current source, wherein the control device is configured to control the current source so as to control a magnitude of the LED drive current, the control device being configured to drive the LEDs based on the setpoint information by controlling the magnitude of the LED drive current and controlling the switching module so as to drive the switches.

10. An LED illumination assembly comprising:

a plurality of LEDs, the LEDs being arranged in groups having respective different colour temperatures, and an LED driver according to claim 1, the LED driver being connected to the plurality of LEDs for driving the plurality of LEDs.

11. The LED illumination assembly according to claim 10, further comprising a current source configured to generate an LED drive current and at least one switch to modulate at least one of the LED groups, wherein the illumination assembly is configured to enable a modulation by the at least one switch to operate asynchronously in respect of a generation of the LED drive current by the current source.

12. The LED driver according to claim 1, wherein, as the LED setpoint information adheres to a setpoint colour temperature curve in a chromaticity diagram, whereby, at the LED setpoint intensity below the threshold, the LED setpoint colour temperature does not coincide with the colour temperatures of each one of the LED groups, the control device is configured to:

deviate from the LED setpoint colour temperature;

select the single one of the LED groups of which the colour temperature does not coincide with the LED setpoint colour temperature; and drive the selected single one of the LED groups of which the colour temperature does not coincide with the LED setpoint colour temperature, at the LED setpoint intensity.

* * * * *